United States Patent
Aiayedh et al.

(10) Patent No.: US 8,943,742 B2
(45) Date of Patent: Feb. 3, 2015

(54) METHOD AND APPARATUS FOR CAPTURING AND TIME-SORTING INSECTS

(75) Inventors: Hassan Y. Aiayedh, Riyadh (SA);
Yousif N. Aldryhim, Riyadh (SA);
Osama J. Aldraihem, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 356 days.

(21) Appl. No.: 13/530,103

(22) Filed: Jun. 21, 2012

(65) Prior Publication Data

US 2013/0340319 A1    Dec. 26, 2013

(51) Int. Cl.
*A01M 1/10* (2006.01)
*A01M 1/02* (2006.01)

(52) U.S. Cl.
USPC .................................. 43/111; 43/107; 43/121

(58) Field of Classification Search
CPC ......... A01M 1/00; A01M 1/02; A01M 1/026; A01M 1/04; A01M 1/06; A01M 1/08; A01M 1/10; A01M 1/106; A01M 1/12
USPC ........ 43/107, 132.1, 113, 139, 122, 121, 111; 119/216; 56/8, 9; 209/908
See application file for complete search history.

(56) References Cited

U.S. PATENT DOCUMENTS

| | | | | |
|---|---|---|---|---|
| 507,630 A | * | 10/1893 | Morton | 43/111 |
| 577,855 A | * | 3/1897 | Hays | 43/111 |
| 622,992 A | * | 4/1899 | Cash et al. | 43/121 |
| 1,043,419 A | * | 11/1912 | Gothberg | 43/111 |
| 1,115,681 A | * | 11/1914 | Keltonik | 43/111 |
| 1,135,710 A | * | 4/1915 | Murphy et al. | 43/111 |
| 1,359,796 A | * | 11/1920 | Dominguez | 43/111 |
| 1,632,276 A | * | 6/1927 | de la Torriente | 43/111 |
| 2,643,481 A | * | 6/1953 | Ederer | 119/216 |
| 2,667,716 A | * | 2/1954 | Garcia | 43/111 |
| 2,778,150 A | * | 1/1957 | Pohlman | 43/139 |
| 3,040,980 A | * | 6/1962 | Mann et al. | 43/100 |
| 3,096,600 A | * | 7/1963 | Gwyther | 119/216 |
| 3,902,457 A | * | 9/1975 | Musgrove et al. | 119/218 |
| 3,967,585 A | * | 7/1976 | Monaco | 119/213 |
| 4,095,092 A | * | 6/1978 | Neff | 119/216 |
| 4,141,174 A | * | 2/1979 | Smith | 43/139 |
| 4,179,839 A | * | 12/1979 | Salotti et al. | 43/112 |
| 4,275,523 A | * | 6/1981 | Baima et al. | 43/112 |

(Continued)

FOREIGN PATENT DOCUMENTS

| | | | | | |
|---|---|---|---|---|---|
| JP | 11155458 A | * | 6/1999 | | A01M 1/10 |
| JP | 2000060402 A | * | 2/2000 | | A01M 1/10 |

(Continued)

*Primary Examiner* — Darren W Ark
(74) *Attorney, Agent, or Firm* — Timberline Patent Law Group PLLC

(57) ABSTRACT

A method and apparatus for capturing and time-sorting insects is provided. The apparatus comprises a receiving unit configured to serve as an entrance for the one or more insects; and facilitate trapping of the one or more insects. The apparatus further comprises a collecting unit comprising a plurality of containers configured to collect and retain the one or more insects trapped via the receiving unit, wherein the collecting unit is attached with the receiving unit such that at least a portion of the receiving unit is movable with respect to the plurality of containers. In addition, the apparatus comprises a control unit operationally connected with the receiving unit, wherein the control unit is configured to enable time-dependent movement of the portion of the receiving unit with respect to the plurality of containers.

13 Claims, 11 Drawing Sheets

(56) References Cited

U.S. PATENT DOCUMENTS

| | | | |
|---|---|---|---|
| 4,351,438 A * | 9/1982 | Morton | 119/216 |
| 4,434,572 A * | 3/1984 | Sheldon et al. | 56/9 |
| 4,501,088 A * | 2/1985 | Boisvert et al. | 43/122 |
| 4,554,759 A * | 11/1985 | Edling et al. | 43/100 |
| 4,706,410 A * | 11/1987 | Briese | 43/122 |
| 4,867,731 A * | 9/1989 | Willard et al. | 43/114 |
| 4,934,537 A * | 6/1990 | DeBourke | 209/939 |
| 4,937,555 A * | 6/1990 | Litzkow et al. | 340/540 |
| 4,963,035 A * | 10/1990 | McCarthy et al. | 209/939 |
| 5,005,416 A * | 4/1991 | Vick et al. | 43/121 |
| 5,123,201 A * | 6/1992 | Reiter | 43/121 |
| 5,181,479 A * | 1/1993 | Hiebert | 56/9 |
| 5,228,233 A * | 7/1993 | Butler et al. | 43/107 |
| 5,551,576 A * | 9/1996 | Importico | 209/705 |
| 5,926,999 A * | 7/1999 | Vernon et al. | 43/121 |
| 6,161,327 A * | 12/2000 | Thomas | 43/114 |
| 6,161,504 A * | 12/2000 | Jungling et al. | 119/216 |
| 6,393,760 B1 * | 5/2002 | Lingren | 43/122 |
| 6,493,363 B1 * | 12/2002 | Shuman et al. | 370/539 |
| 6,516,558 B1 * | 2/2003 | Lingren et al. | 43/107 |
| 6,564,503 B1 * | 5/2003 | Miyahara et al. | 43/112 |
| 6,637,150 B1 * | 10/2003 | Oi et al. | 43/107 |
| 6,882,279 B2 * | 4/2005 | Shuman et al. | 340/573.2 |
| 6,937,156 B2 * | 8/2005 | Gardner et al. | 340/573.2 |
| 6,990,768 B1 * | 1/2006 | Boston | 43/107 |
| 7,071,829 B2 * | 7/2006 | Gardner et al. | 43/107 |
| 7,082,712 B2 * | 8/2006 | Harris et al. | 43/122 |
| 7,496,228 B2 * | 2/2009 | Landwehr et al. | 382/170 |
| 7,516,572 B2 * | 4/2009 | Yang et al. | 43/107 |
| 7,591,099 B2 * | 9/2009 | Lang et al. | 43/107 |
| 7,669,362 B2 * | 3/2010 | Cwiklinski et al. | 43/122 |
| 7,779,575 B2 * | 8/2010 | Hirafuji et al. | 43/112 |
| 7,916,951 B2 * | 3/2011 | Landwehr et al. | 382/224 |
| 8,139,858 B1 * | 3/2012 | Landwehr et al. | 382/170 |
| 8,240,081 B2 * | 8/2012 | Cuellar Bernal | 43/107 |
| 8,319,649 B1 * | 11/2012 | Devane | 43/132.1 |
| 8,693,778 B1 * | 4/2014 | Landwehr et al. | 382/170 |
| 2006/0218851 A1 * | 10/2006 | Weiss et al. | 43/107 |
| 2007/0068068 A1 * | 3/2007 | Weiss et al. | 43/132.1 |
| 2007/0094915 A1 * | 5/2007 | Plato et al. | 43/107 |
| 2008/0163541 A1 * | 7/2008 | Harris | 43/121 |
| 2009/0223116 A1 * | 9/2009 | Meghji et al. | 119/6.5 |
| 2010/0071255 A1 * | 3/2010 | Zilbershlag | 43/107 |
| 2010/0139151 A1 * | 6/2010 | Cwiklinski et al. | 43/107 |
| 2010/0212211 A1 * | 8/2010 | Scheubeck et al. | 43/107 |
| 2010/0229459 A1 * | 9/2010 | Simchoni-Barak et al. | 43/113 |
| 2011/0005123 A1 * | 1/2011 | Will | 43/113 |
| 2013/0199082 A1 * | 8/2013 | Haik | 43/121 |
| 2013/0204581 A1 * | 8/2013 | Park et al. | 43/112 |
| 2013/0283670 A1 * | 10/2013 | Parys et al. | 43/107 |
| 2013/0283671 A1 * | 10/2013 | Czokajlo et al. | 43/113 |
| 2013/0293710 A1 * | 11/2013 | Afanasyev et al. | 43/107 |
| 2014/0060217 A1 * | 3/2014 | Prasifka | 43/107 |

FOREIGN PATENT DOCUMENTS

| | | | | |
|---|---|---|---|---|
| JP | 2000060403 A * | 2/2000 | | A01M 1/02 |
| JP | 2000135043 A * | 5/2000 | | A01M 1/10 |
| JP | 2000333581 A * | 12/2000 | | A01M 1/02 |
| JP | 2002000154 A * | 1/2002 | | A01M 1/02 |
| JP | 2003169584 A * | 6/2003 | | A01M 1/00 |
| JP | 2003180219 A * | 7/2003 | | A01M 1/02 |
| JP | 2003304788 A * | 10/2003 | | A01M 1/02 |
| JP | 2005021074 A * | 1/2005 | | A01M 1/00 |
| JP | 2005237317 A * | 9/2005 | | A01M 1/00 |
| JP | 2008099598 A * | 5/2008 | | A01M 1/00 |
| JP | 2012019697 A * | 2/2012 | | A01M 1/02 |

* cited by examiner

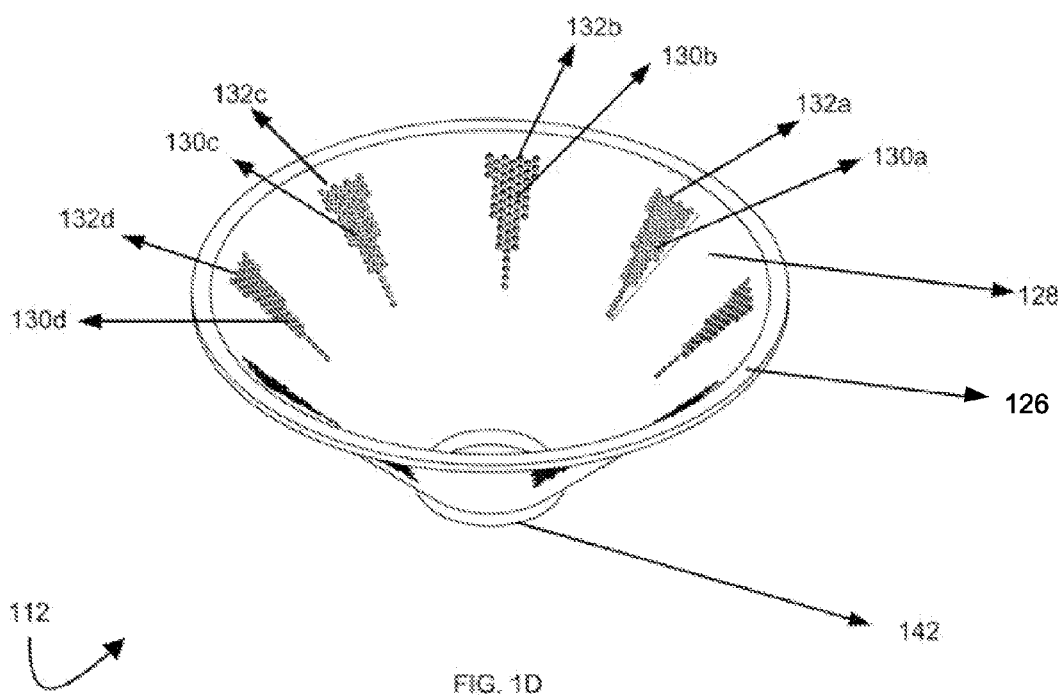

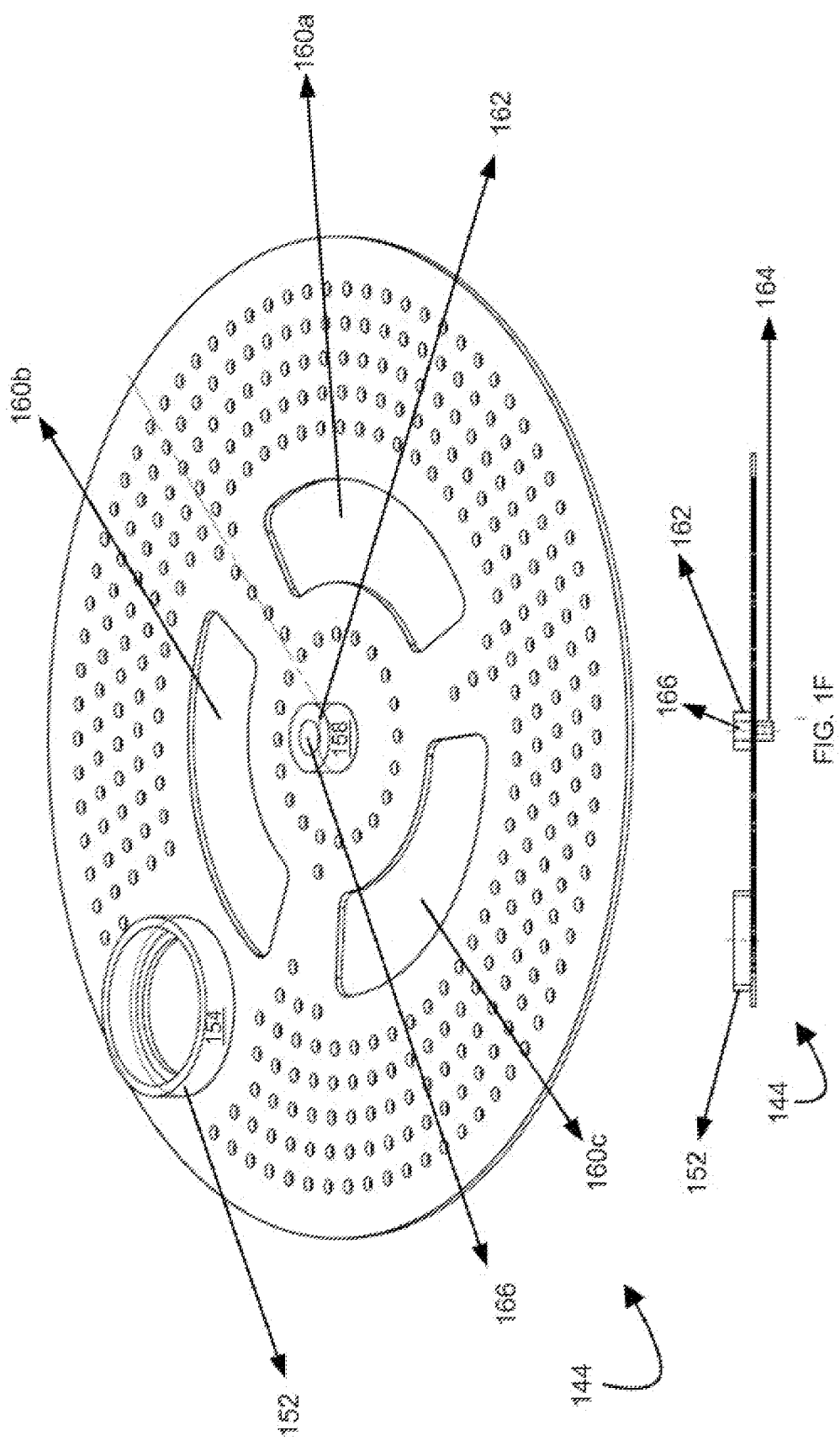

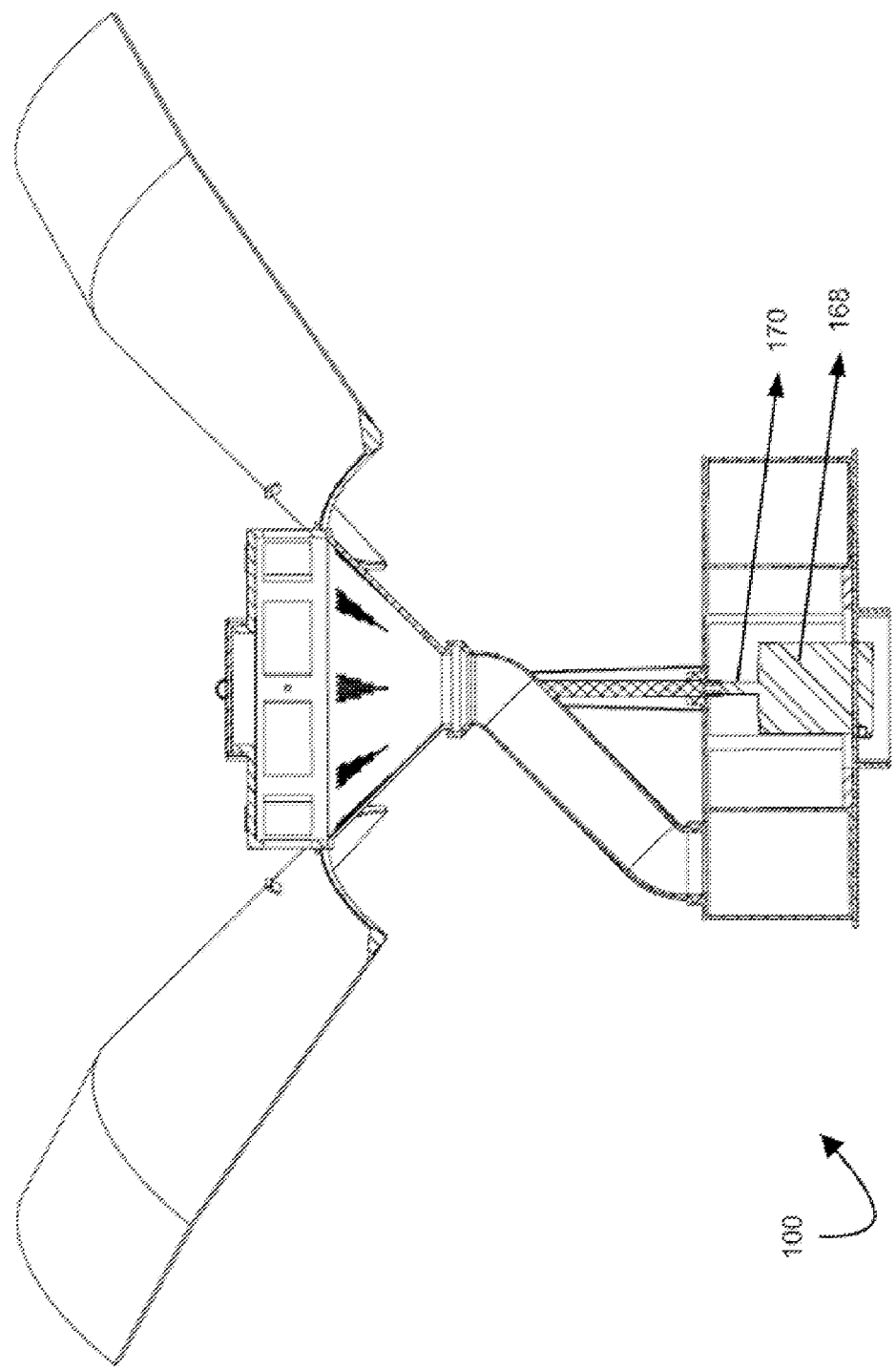

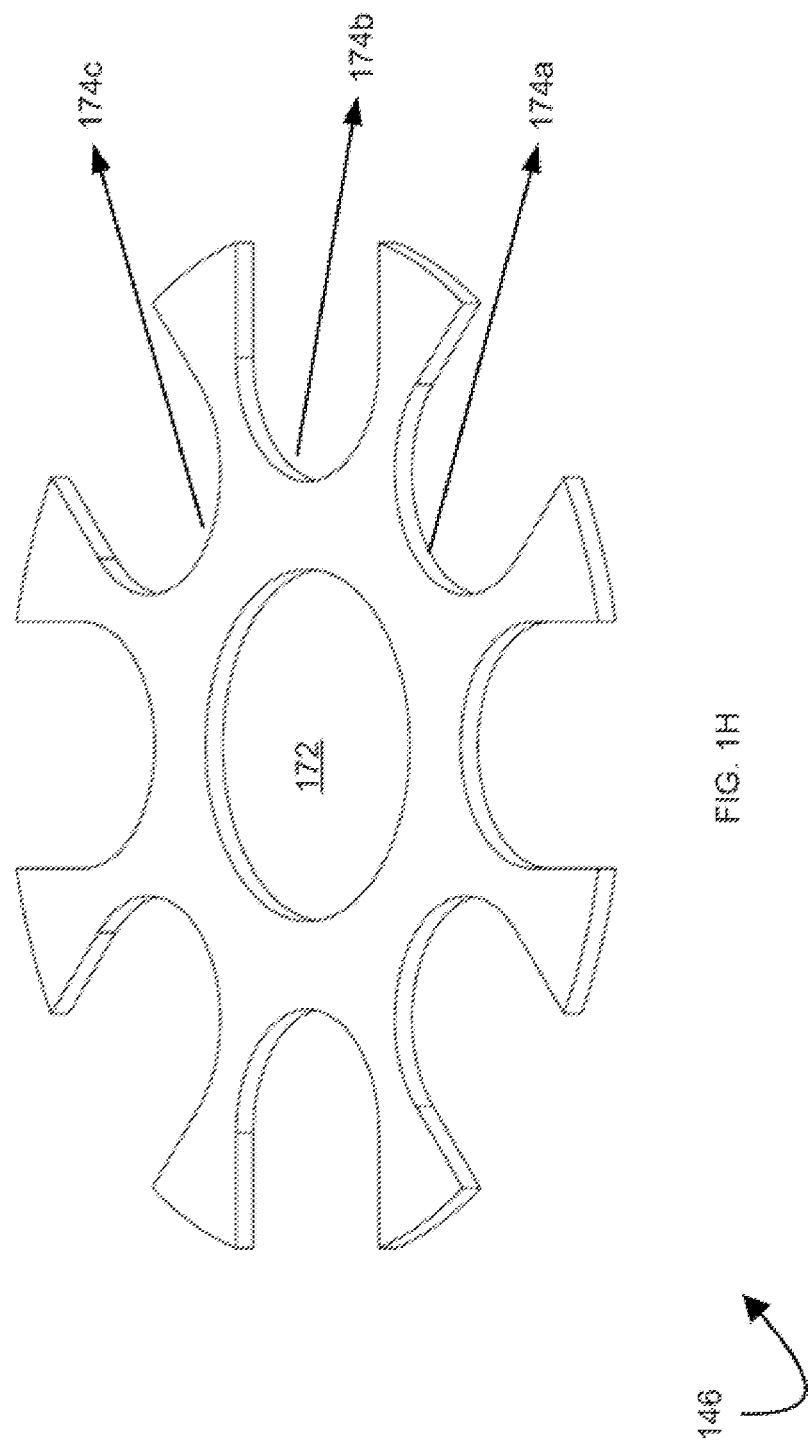

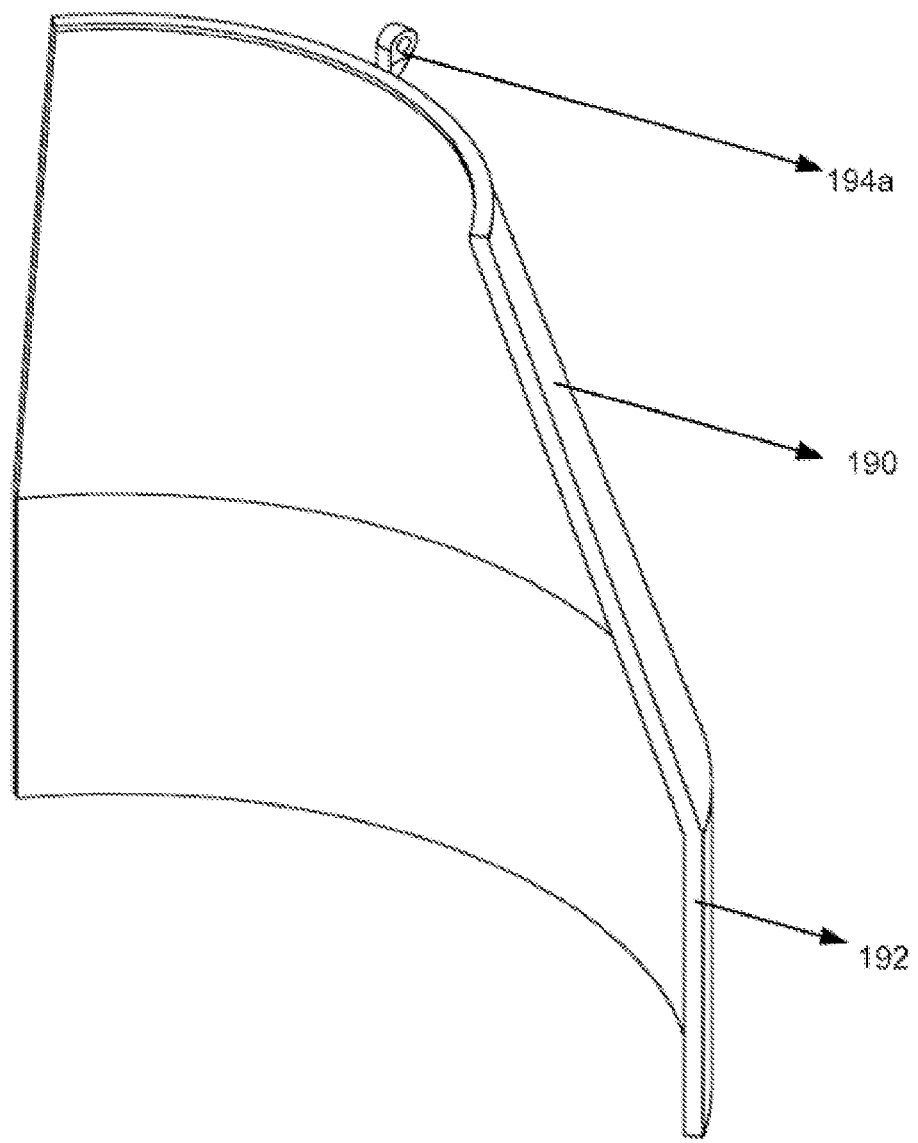
FIG 1J

US 8,943,742 B2

METHOD AND APPARATUS FOR CAPTURING AND TIME-SORTING INSECTS

FIELD OF THE INVENTION

The invention generally relates to capturing insects. More specifically, the invention relates to time-sorting of captured insects.

BACKGROUND OF THE INVENTION

Insect traps have been traditionally used for surveying density and abundance of insects. In general, these traps are placed in locations such as palm plantations, to investigate the occurrence and abundance of insects such as, but not limited to, arthropods such as springtails and beetles. These traps also find use in monitoring activity patterns of various insects.

When used for monitoring the activity patterns of insects, these traps are generally either planted in the ground in close proximity to trees or suspended on trees. In operation, bait is usually disposed within these traps to lure insects as they move out of the trees in search of new hosts. In the process of finding new hosts, these insects typically get attracted to the bait and end up getting trapped in collection units of these traps. The collection units are designed to contain baited insects for monitoring their activity pattern. Sometimes, the collection units are operationally connected with an external power supply for time-sorting the collected insects for studying the activity pattern.

Even though, these insect traps are used for monitoring the activity pattern of insects, they have numerous limitations. Firstly, these traps are bulky and can only be used to monitor activity pattern of ground-dwelling insects. In addition, these traps lack the ability to efficiently sort the captured insects based on the captured time. Moreover, since the traps depend on external power supply, they cannot be used in remote locations where such power supply is not readily available.

In view of the above, there is a need for an improved method and apparatus for capturing and time-sorting insects.

BRIEF DESCRIPTION OF THE FIGURES

The accompanying figures wherein like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1D illustrates a perspective view of a first trapping part of the apparatus for capturing and time-sorting insects, in accordance with an embodiment of the invention.

FIG. 1F illustrates perspective views of a perforated disk of the apparatus for capturing and time-sorting insects, in accordance with an embodiment of the invention.

FIG. 1G illustrates a sectional view of the apparatus for capturing and time-sorting insects, in accordance with an embodiment of the invention.

FIG. 1H illustrates a perspective view of a separator of the apparatus for capturing and time-sorting insects, in accordance with an embodiment of the invention.

FIG. 1I illustrates a perspective view of a support structure of the apparatus for capturing and time-sorting insects, in accordance with an embodiment of the invention.

FIG. 1J illustrates a perspective view of a support frame of the apparatus for capturing and time-sorting insects, in accordance with an embodiment of the invention.

Figure 1A:
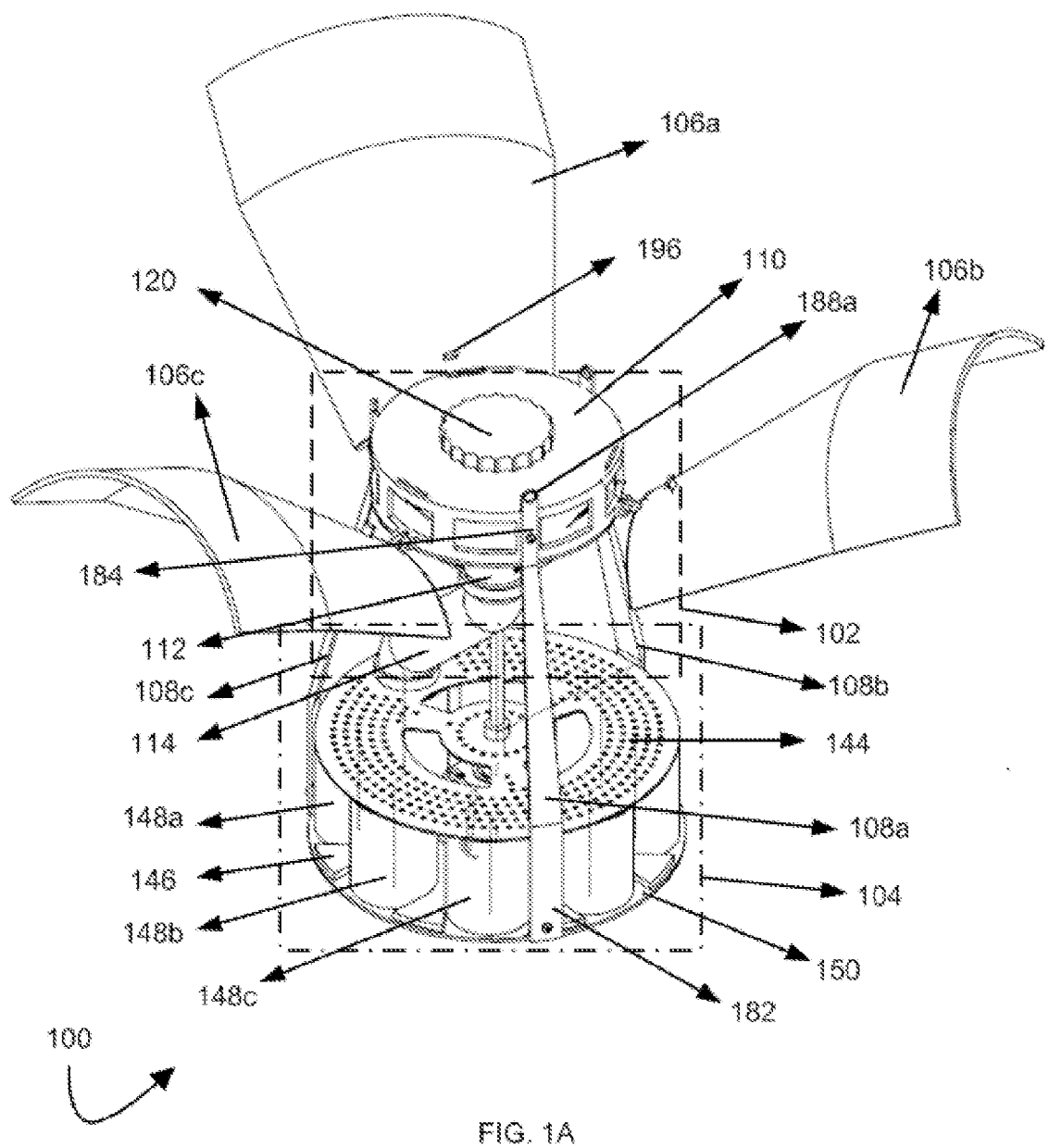
FIG. 1A illustrates a perspective view of an apparatus for capturing and time-sorting insects, in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of apparatus components and method steps related to capturing and time-sorting insects. Accordingly, the apparatus components and method steps have been represented where appropriate by conventional symbols in the drawings, showing only those specific details that are pertinent to understanding the embodiments of the invention so as not to unnecessarily obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides an apparatus for capturing and time-sorting insects such as, but not limited to, arthropods such as *Rhynchophorus ferrugineus* f, *Rhynchophorus* spp, *Orcytes* spp, *Cerambycides* and so forth.

In various embodiments, the invention provides an apparatus for capturing and time-sorting one or more insects. The apparatus comprises a receiving unit, a collecting unit and a control unit. The receiving unit is configured to serve as an entrance for the one or more insects. In addition, the receiving unit is configured to facilitate trapping of the one or more insects. The collecting unit comprises a plurality of containers configured to collect and retain the one or more insects trapped via the receiving unit. Further, the collecting unit is attached with the receiving unit such that at least a portion of the receiving unit is movable with respect to the plurality of containers. The control unit is operationally connected with the receiving unit, wherein the control unit is configured to enable time-dependent movement of the portion of the receiving unit with respect to the plurality of containers. The time-dependent movement enables collection and retention of the one or more insects in the one or more containers during a predetermined period of time for time-sorting the one or more insects.

FIG. 1A illustrates a perspective view of an apparatus 100 for capturing and time-sorting insects, in accordance with an embodiment of the invention. As illustrated, apparatus 100 includes a receiving unit 102, a collecting unit 104, one or more support structures such as, but not limited to, support structures 106a, 106b and 106c, and one or more support members such as, but not limited to, support members 108a, 108b and 108c.

In various embodiments of the invention, insects can enter apparatus 100 via receiving unit 102. In an embodiment, receiving unit 102 includes a first receiving part 110, a first trapping part 112 and a second trapping part 114. Although in accordance with the embodiment, receiving unit 102 is an assembly including various parts, it would be apparent to the skilled artisan that receiving unit 102 may be a single unit. Other variations in design of receiving unit 102 would be apparent to the skilled artisans.

Figure 1B:
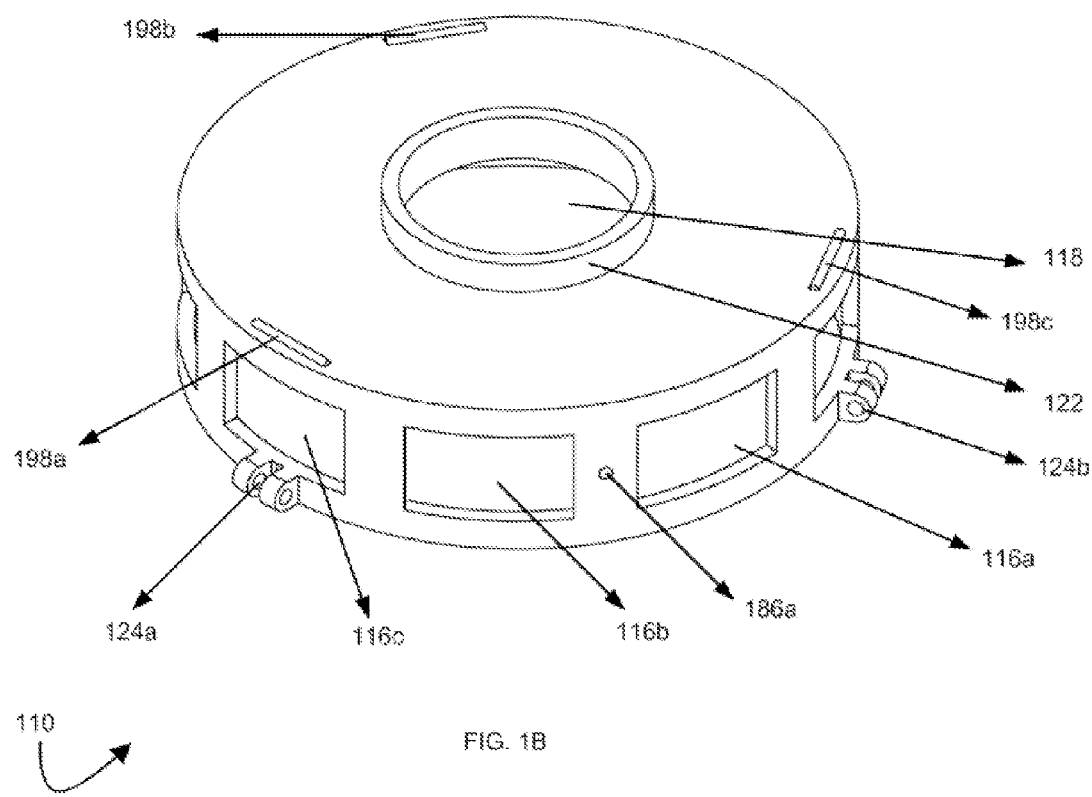
FIG. 1B illustrates a perspective view of a first receiving part of the apparatus for capturing and time-sorting insects, in accordance with an embodiment of the invention.

In accordance with an embodiment illustrated in FIG. 1B, first receiving part 110 is substantially tubular and includes one or more openings such as, openings 116a, 116b and 116c. Each opening, such as opening 116a, may be of a predetermined shape to facilitate access to insects to other components of apparatus 100. In accordance with the embodiment illustrated in FIG. 1B, the one or more openings are rectangular and are uniformly distributed along the circumferential surface of first receiving part 110.

First receiving part 110 may additionally include an opening 118 for enabling attachment of a bait (not illustrated in figures) within apparatus 100. In accordance with the embodiment illustrated in FIG. 1B, opening 118 is substantially circular and may optionally be covered using a capping member 120 (illustrated in FIG. 1A). In an embodiment, capping member 120 is a serrated lid used for covering opening 118 and accommodating the bait within first receiving part 110. A first engagement surface (not illustrated in figures) of capping member 120 and a first peripheral surface 122 about opening 118 may be appropriately threaded to enable attachment of capping member 120 with opening 118 so as to accommodate the bait within first receiving part 110. In an embodiment, the bait is attached to a thread or string (not illustrated in figures) for accommodating the bait within first receiving part 110. The thread may subsequently be locked between the first engagement surface of capping member 120 and the first peripheral surface 122 about opening 118 to accommodate the bait within first receiving part 110. The bait may alternately be appropriately accommodated within or proximal to apparatus 100 to lure insects into apparatus 100.

Figure 1C:
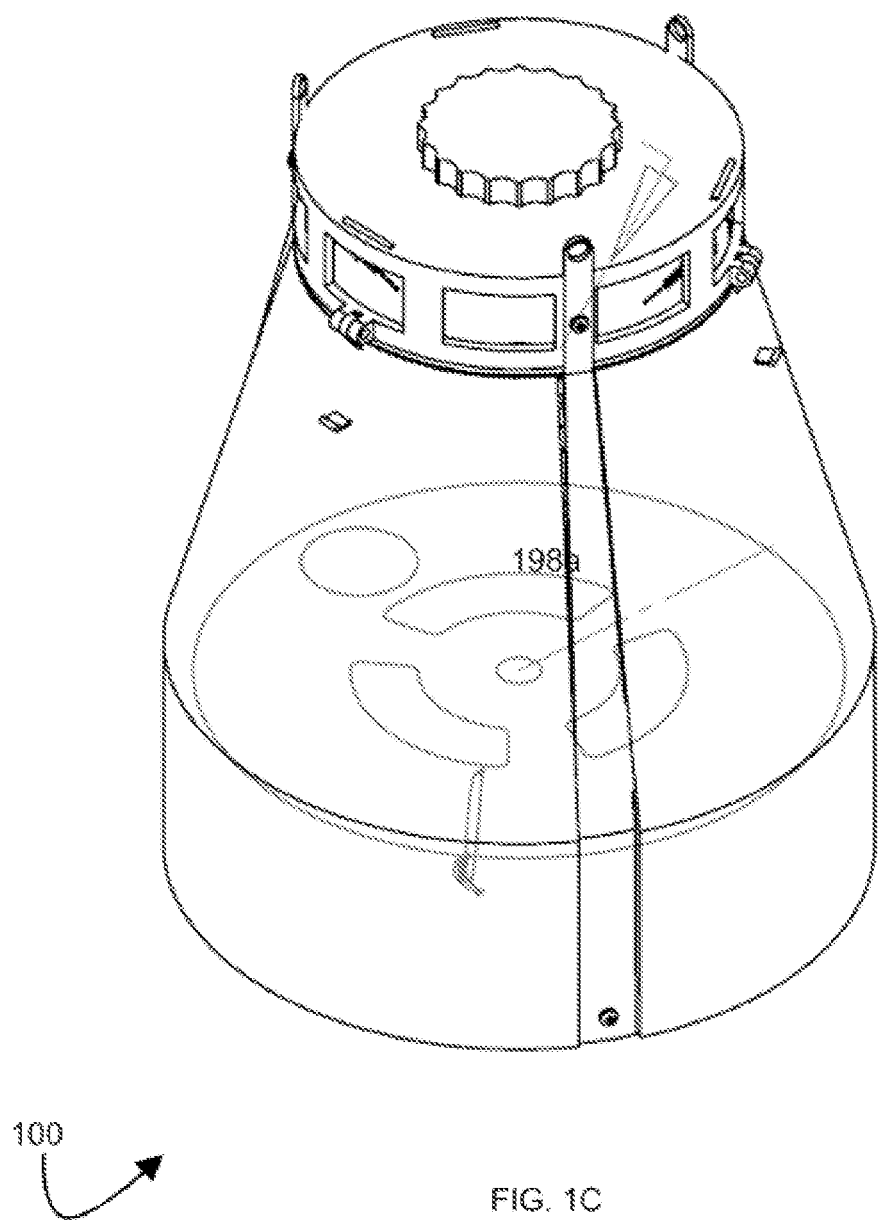
FIG. 1C illustrates a perspective view of the apparatus for capturing and time-sorting insects, in accordance with another embodiment of the invention.

In an embodiment of the invention illustrated in FIG. 1B, first receiving part 110 includes one or more protrusions such as, but not limited to, protrusions 124a and 124b, and a slot 124. The protrusions such as protrusions 124a and 124b, enable movement of support structures such as support structures 106a, 106b and 106c, from an open position illustrated in FIG. 1A to a closed position illustrated in FIG. 1C, and vice versa.

In accordance with the embodiment illustrated in FIG. 1A, first receiving part 110 is attached with first trapping part 112. First trapping part 112 is configured to receive insects from first receiving part 110. In an embodiment, first receiving part 110 is combined with first trapping part 112 so as to form a single unit.

In an embodiment illustrated in FIG. 1D, first trapping part 112 is funnel shaped and is rigidly attached with first receiving part 110. In an exemplary embodiment, first receiving part 110 is attached to first trapping part 112 by rigidly gluing a first rim 126 of first trapping part 112 to a first surface (not illustrated in figures) of first receiving part 110. It will be apparent that first receiving part 110 may be attached to first trapping part 112 may be using other suitable arrangements.

In the embodiment illustrated in FIG. 1D, a first surface 128 of first trapping part 112 is of a desired surface texture so as to enable trapping of insects within apparatus 100. For example, first surface 128 may be sufficiently smooth to force insects such as red palm weevils to slide along first surface 128 as they enter apparatus 100 via first receiving part 110. First surface 128 may additionally include a plurality of grouped openings such as, but not limited to, grouped openings 130a, 130b, 130c and 130d. The plurality of grouped openings may be uniformly distributed along first surface 128 so as to permit relative alignment between grouped openings 130a, 130b, 130c and 130d, and openings 116a, 116b, and 116c of first receiving part 110. For example, grouped openings 130a, 130b, 130c, and 130b may be provided such that when first receiving part 110 is attached with first trapping part 112, each of the plurality of grouped openings is substantially between two openings of openings 116a, 116b, and 116c of first receiving part 110. In the embodiment illustrated in FIG. 1D, each of the plurality of grouped openings is an aggregation of a plurality of openings. Further, the aggregation of the plurality of openings is arranged in a substantially triangular arrangement, wherein base such as base 132a, 132b, 132c and 132d of each substantially triangular arrangement is proximal to first receiving part 110. It would be apparent that providing the plurality of grouped openings on first surface 128 facilitates luring of insects into apparatus 100 as the lure and other bait gases can escape through the plurality of grouped openings towards openings 116a, 116b and 116c of first receiving part 110. Other variations in the arrangement of the plurality of grouped openings along first surface 128 of first trapping part 112 would be apparent to the skilled artisans.

In accordance with the embodiment illustrated in FIG. 1A, first trapping part 112 is movably attached with second trapping part 114, and is configured to receive insects from first trapping part 112. In an embodiment, first receiving part 110 is combined with first trapping part 112 so as to form a single unit, and second trapping part 114 is coupled to first trapping part 112 such that second trapping part 114 has a rotational degree of freedom with respect to the combined first receiving part 110 and first trapping part 112.

Figure 1E:
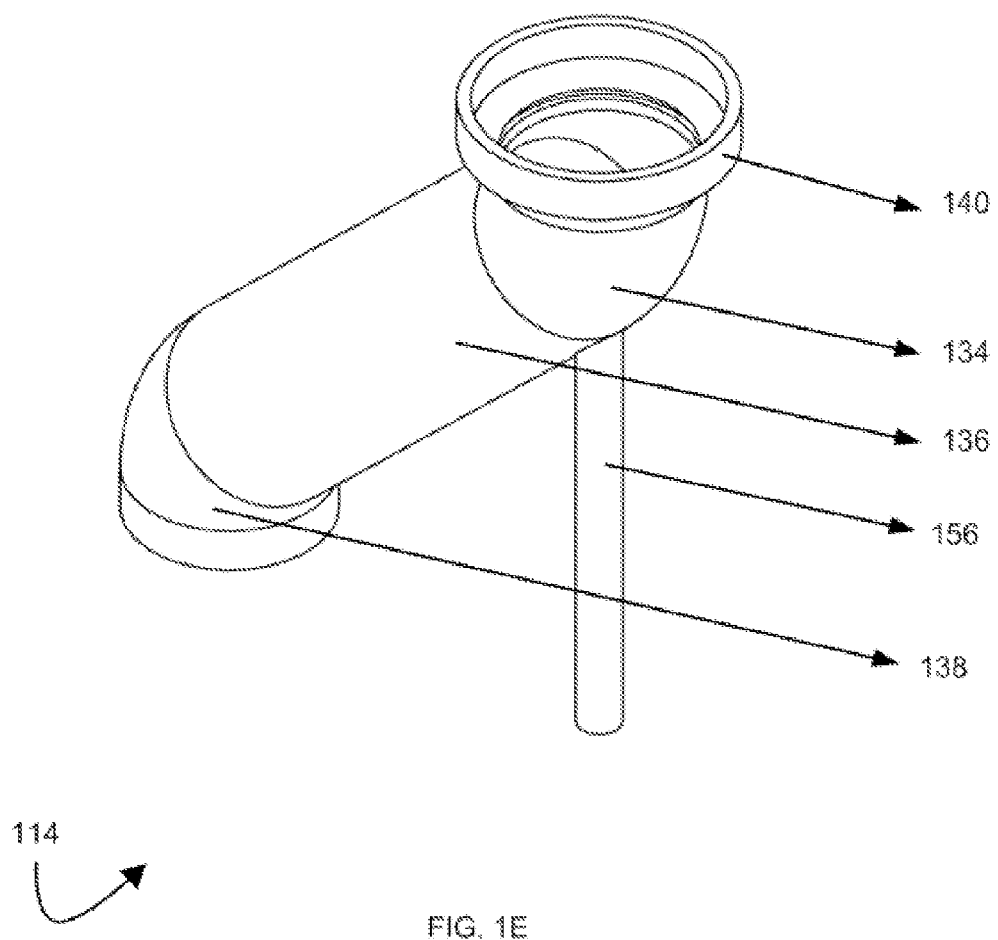
FIG. 1E illustrates a perspective view of a second trapping part of the apparatus for capturing and time-sorting insects, in accordance with an embodiment of the invention.
Figure 11:
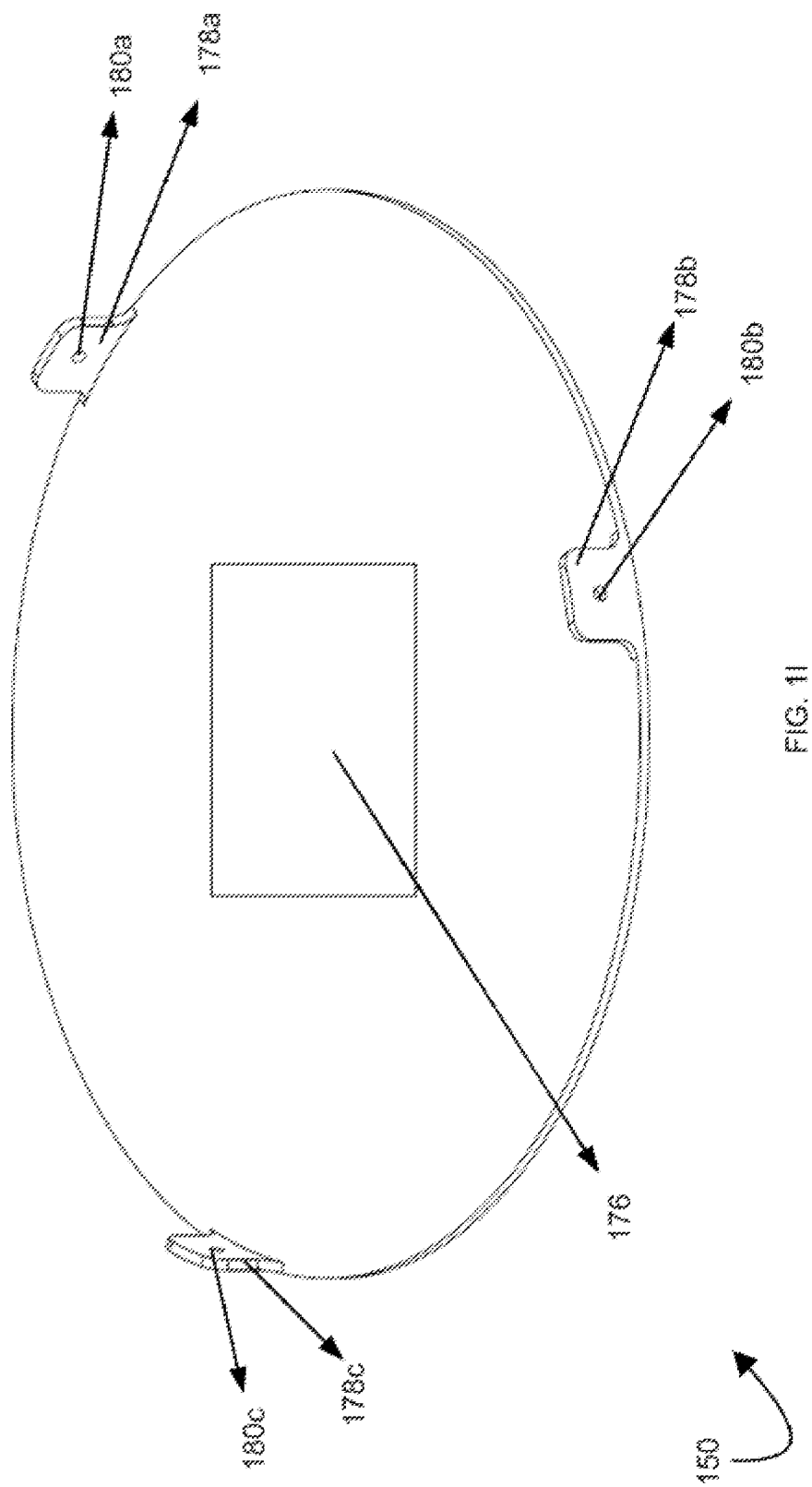

In an embodiment illustrated in FIG. 1E, second trapping part 114 is substantially tubular. In addition, the internal surface (not illustrated in figures) of second trapping part 114 is of a desired surface texture so as to facilitate trapping of insects within apparatus 100.

As illustrated in FIG. 1E, second trapping part 114 includes a first part 134, a second part 136, and a third part 138. In accordance with the embodiment, second trapping part 114 is movably attached with first trapping part 112. In order to permit movement of second trapping part 114 relative to first trapping part 112, a rim 140 of first part 134 is attached with a second rim 142 (illustrated in FIG. 1D) of first trapping part 112 so as to form a no touch sleeve.

In accordance with the embodiment illustrated in FIG. 1E, second part 136 is tubular and is rigidly attached to first part 134 such that second part 136 is inclined with respect to collecting unit 104. In an exemplary embodiment, second part 136 may be inclined at an angle of 45° to force insects such as weevils to slide along the internal surface of second part 136 as they enter second part 136 via first part 134.

In accordance with the embodiment illustrated in FIG. 1E, second part 136 is rigidly attached with third part 138. Third part 138 facilitates trapping of insects in collecting unit 104.

In various embodiments, collecting unit 104 is attached with receiving unit 102 for collecting and retaining samples of insects.

In accordance with the embodiment illustrated in FIG. 1A, collecting unit 104 includes a perforated disk 144, a separator 146, one or more containers such as, but not limited to, containers 148a, 148b, and 148c, and a support frame 150.

In the embodiment illustrated in FIG. 1A, collecting unit 104 is attached with second trapping part 114 of receiving unit 102. In accordance with the embodiment, collecting unit 104 is attached with second trapping part 114 by attaching third part 138 of second trapping unit 114 with perforated disk 144 of collecting unit 104. Second trapping part 114 is rigidly attached at a rim portion 152 (illustrated in FIG. 1A) of third part 138 with a cylindrical protrusion 154 (illustrated in FIG. 1F) of perforated disk 144. In addition to rigidly attaching third part 138 with perforated disk 144, a longitudinal shaft 156 is used to attach second trapping part 114 and perforated disk 144. Attachment of perforated disk 144 with second trapping part 114 permits movement of second trapping part 114 along with movement of perforated disk 144. Longitudinal shaft 156 attaches second trapping part 114 with a central portion 158 of perforated disk 144. In addition, longitudinal shaft 156 is rigidly attached to both second trapping part 114 and perforated disk 144 such that the combination of second trapping unit 114 and perforated disk 144 acts as a single unit. Attaching second trapping part 114 with perforated disk 144 also enables relative movement between second trapping part 114 and one or more components of collecting unit 104.

In an embodiment illustrated in FIG. 1F, perforated disk 144 includes a plurality of holes and facilitates collection and retention of trapped insects within the one or more containers of collecting unit 104. It will be apparent that providing openings on perforated disk 144 enables evaporated gases of the bait and captured insects (if already trapped) to escape towards first receiving part 110.

In accordance with the embodiment illustrated in FIG. 1F, perforated disk 144 includes one or more openings such as openings 160a, 160b, and 160c. In an exemplary embodiment, the one or more openings are uniformly distributed about central portion 158 of perforated disk 144. It will be apparent that providing such openings on perforated disk 144 facilitates in reducing the weight of perforated disk 144, while facilitating in collection and retention of the trapped insects.

In the embodiment illustrated in FIG. 1F, central portion 158 of perforated disk 144 includes a first cylindrical protrusion 162 and a second cylindrical protrusion 164, wherein both first cylindrical protrusion 162 and second cylindrical protrusion 164 are coaxial and accommodate a coaxial opening 166.

In accordance with the embodiment illustrated in FIG. 1G, apparatus 100 comprises a motor 168 configured to enable time-dependent movement of second trapping part 112. Longitudinal shaft 156 is attached with central portion 158 such that perforated disk 144 and longitudinal shaft 156 can be rotated using motor 168. In order to enable rotation of perforated disk 144 and longitudinal shaft 156 using motor 168, longitudinal shaft 156 is rigidly attached to first cylindrical protrusion 162 and second cylindrical protrusion 164 is rigidly attached with a rotor 170 of motor 168, thereby enabling rotation of perforated disk 144 and longitudinal shaft 156 using motor 168. It would be apparent that this connection enables rotation of second trapping part 112 and perforated disk 144 with respect to containers such as containers 148a, 148b, and 148c, and support frame 150. The skilled person would appreciate that it is possible to redesign apparatus 100 such that containers such as containers 148a, 148b, and 148c are caused to rotate instead of second trapping part 112 and perforated disk 144 for time-sorting.

In an exemplary embodiment, motor 168 is operationally connected with a switching unit (not illustrated in figures), and a control unit (not illustrated in figures). The switching unit is operationally connected with motor 168 and the control unit using connection members such as wires. The switching unit may be provided at a peripheral portion of apparatus 100 such that the switching unit can be used to operate motor 168. In accordance with the exemplary embodiment, the switching unit includes an on-off switch and a reset button. The on-off switch may be used to turn the control unit on or off, and the reset button can be used to reset the control unit. The control unit is also operationally connected with motor 168 and one or more batteries, and can be used to send motion signals to motor 168. In an exemplary embodiment, the control unit is a Printed Circuit Board (PCB) and includes one or more electronic components and integrated circuits. In accordance with the exemplary embodiment, the control unit is configured to provide the functionality of a controller, a driver, a time-sorter, and a battery indicator. The control unit and the batteries may be fixed at a first surface (not illustrated in figures) of support frame 150, and motor 168 can be fixed at a central position, such as opening 172 of separator 146. It will be apparent that motor 168 bears the weight of perforated disk 144, longitudinal shaft 156 and second trapping part 114. It will also be apparent that the control unit controls motor 168, thereby controlling movement of other components of apparatus 100 connected with motor 168.

In an exemplary embodiment, the control unit includes an operation mode switch for controlling the number of times rotor 170 rotates, the amount of rotation to be imparted to rotor 170 in each rotation and the time intervals after which rotor 170 is to be rotated. For example, if apparatus 100 is to be used to collect insect samples on an hourly basis and that the samples are to be collected in four containers, then the operation mode switch may be used to set the cycle time to one hour. In the example, rotor 170 is to be rotated four times in the one hour cycle, wherein each rotation rotor 170 is to rotate a $\frac{1}{4}^{th}$ rotation, or in other words by 90°, such that it causes perforated disk 144 to rotate about the axis of longitudinal shaft 156 by 90°. It would be apparent that depending on the desired sampling time and the number of containers, the amount of rotation to be imparted to rotor 170 can be varied.

In accordance with the exemplary embodiment, perforated disk 144 encapsulates the one or more containers such as containers 148a, 148b and 148c, thereby facilitating in collection and retention of insects within the one or more containers. In an exemplary embodiment, perforated disk 144 is separated from the open end of the one or more containers by a predetermined distance so as to permit rotation of perforated disk 144. The separation between the containers and perforated disk 144 can be in the range of 1-3 millimeters to facilitate rotation of perforated disk 144 and collection and retention of insects within the one or more containers. The one or more containers may be cylindrical in shape and may be removably attached to support frame 150. In order to facilitate removable attachment of the one or more containers, collecting unit 104 includes separator 146.

Separator 146 in accordance with the embodiment illustrated in FIG. 1H includes an opening 172 for accommodating motor 168. Separator 146 further includes a plurality of substantially cylindrical openings such as 174a, 174b and 174c, for accommodating the one or more containers. The one or more containers such as containers 148a, 148b and 148c, can be removably accommodated in the plurality of substantially cylindrical openings as illustrated in FIG. 1A. In addition, separator 146 and the one or more containers may be positioned appropriately on support frame 150 such that cylindrical protrusion 154 of perforated disk 144 is aligned with at least one of the one or more containers. It will be apparent that once aligned with one container, perforated disk 144 can be appropriately rotated using motor 168 to collect samples in all the containers in a time-sorted manner.

Separator 146 may be rigidly attached with support frame 150. In accordance with the embodiment illustrated in FIG. 1I, support frame 150 is a cylindrical disk and includes a rectangular slot 176 for accommodating motor 168. In addition, support frame 150 includes one or more protrusions such as protrusion 178a, 178b and 178c to permit attachment of collecting unit 104 and receiving unit 102. Each protrusion includes a slot such as slot 180a, 180b, and 180c, which can be used to attach collecting unit 104 with receiving unit 102 using the support members 108a, 108b and 108c. In accordance with the embodiment, a first end 182 (illustrated in FIG. 1A) of a support member such as support member 108a is attached with slot 180a, and a second end 184 (illustrated in FIG. 1A) of support member 108a is attached with a slot 186a (illustrated in FIG. 1B) provided on first receiving part 110. In an exemplary embodiment, the support members 108a, 108b and 108c are attached to separate first trapping part 112 and second trapping part 114 so as to permit relative movement between first trapping part 112 and second tapping part 114. First trapping part 112 and second trapping part 114 may be separated by 1-2 millimeters so as to permit the movement between first trapping part 112 and second trapping part 114. In an exemplary embodiment, each support member is provided with a slot such as slot 188a (illustrated in FIG. 1A) to facilitate attachment of apparatus 100 at a desired location. For example, apparatus 100 can be hanged on a tree branch using slot 188a.

Support structures such as support structure 106a, 106b and 106c may be used to encapsulate at least one of the first trapping part 112, the second trapping part 114, the perforated disk 144, and the plurality of containers, such as containers 148a, 148b and 148c (as illustrated in FIG. 1A). As described, each support structure 106a may be movably attached with protrusions such as 124a and 124b (illustrated in FIG. 1B) of first receiving part 110 to permit movement of support structure 106a from the open position illustrated in FIG. 1A to the closed position illustrated in FIG. 1C.

In an embodiment illustrated in FIG. 1J, each support structure is substantially conical at a first part 190 and substantially cylindrical at a second part 192. In accordance with the embodiment illustrated in FIG. 1C, the substantially conical parts encapsulate receiving unit 102 in the closed position, and the substantially cylindrical parts encapsulate collecting unit 104. Additionally, each support structure includes a protrusion such as protrusion 194a, to permit attachment of the support structure with first receiving part 110, wherein the support structure is attached at a protrusion such as protrusion 124a of first receiving part 110. In the embodiment illustrated in FIG. 1A, the support structures 106a, 106b and 106c may be kept open by hooking a locking member 196 to a protrusion such as protrusion 198a (illustrated in FIG. 1B) in first receiving part 110.

The support structures may be attached to first receiving part 110 using one or more screws, nuts and bolts, or other suitable attachment components so as to permit said movement of the support structures with respect to receiving unit 104. The support structures may also be attached with receiving unit 104 using other suitable attachment components. For example, the support structures can be attached with receiving unit 104 using one or more hinges. The support structures may be moved between the open position illustrated in FIG. 1A and the closed position illustrated in FIG. 1C using the attachment components. For example, if the attachment is accomplished using nuts and bolts, the nuts can be loosened to move the support structures, and once the support structures are in a desired position, the nuts can be tightened to retain the support structures in the desired position.

The support structures may serve as a gateway for providing access to insects to other components of apparatus 100 in the open position illustrated in FIG. 1A. Accordingly, a part, such as first part 190 and second part 192 (illustrated in FIG. 1J), of each support structure may be of a desired surface roughness so as to permit easy access to insects to other components of apparatus 100. For example, first part 190 could be extremely rough so that insects may easily climb on first part 190 to access other components of apparatus 100.

Alternately, in another embodiment, insects can directly access receiving unit 102. It would be apparent to the skilled artisan that an insect may access receiving unit 102 without having to access the support structures. The support structures may however facilitate in luring insects into receiving unit 102. For example, the support structures may be designed to appear similar to flower petals, thereby facilitating in luring insects. Also, the surface texture of the support structures may be made similar to flower petals for luring insects into receiving unit 102.

Various components of apparatus 100 may be made from plastic, metal or any other appropriately rigid materials. It would however be apparent to the skilled artisan that using materials which are relatively lighter such as plastic would aid in controlling the weight of apparatus 100. It would also be apparent that the surface texture and design of the components can be appropriately varied depending on the variety of insects to be captured.

Figure 2:
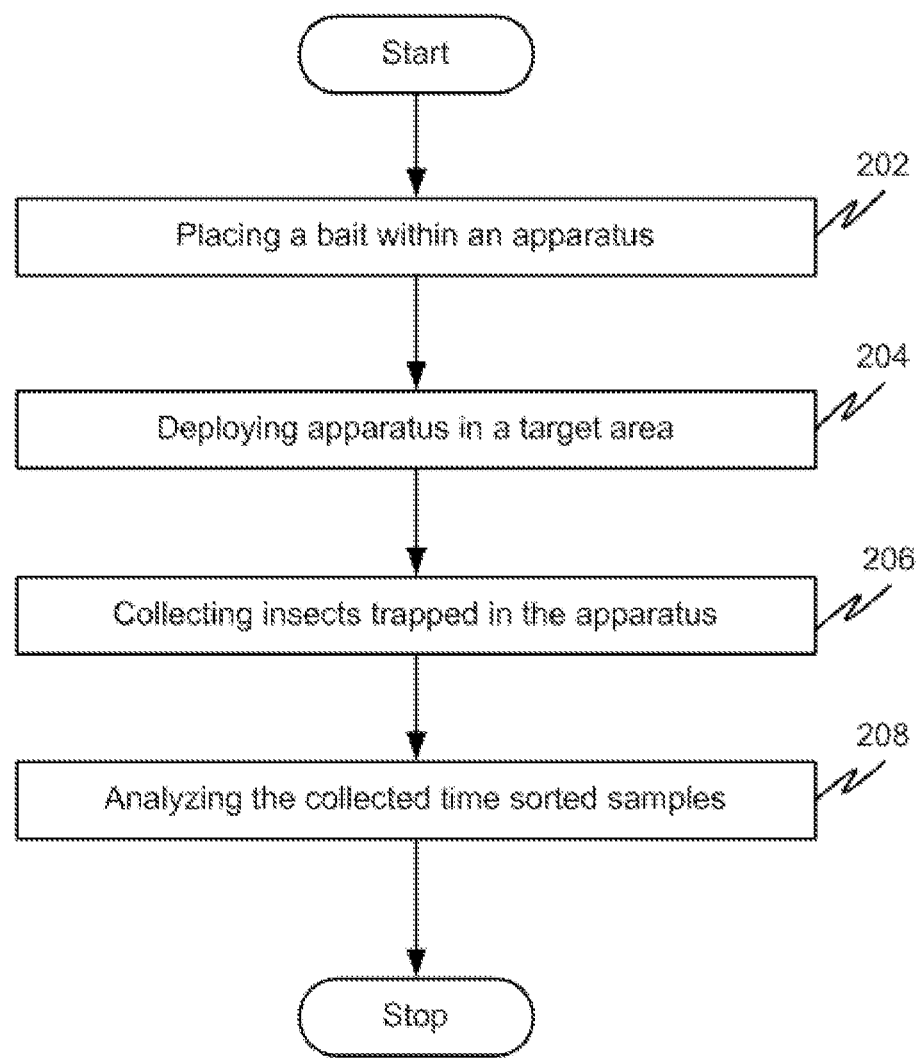
FIG. 2 illustrates a flow diagram of a method for capturing and time-sorting insects, in accordance with an embodiment of the invention.

FIG. 2 illustrates a flow diagram of a method of capturing and time-sorting insects, in accordance with an embodiment of the invention. The steps of the method of capturing and time-sorting insects are carried out using various components of apparatus 100 described in detail in conjunction with the description of FIGS. 1A-1J.

At step 202, a bait is placed within receiving unit 102. The bait may alternately be placed at a suitable position other than within receiving unit 102. It would be apparent that it would be advantageous to place the bait within one or more of receiving unit 102 and a container, such as container 148a, as it would serve to lure insects into apparatus 100 via the openings of first receiving part 110. The bait used may be appropriately selected according to the insects to be collected. For example, dates can be used as bait if adults of red palm weevil are to be collected using apparatus 100. The bait used may also be selected based on the chemical substance it releases. For example, a bait releasing pheromones or kairomones or a combination of pheromones and kairomones may be used depending on the species of insects to be captured. The bait may have to be changed or replenished after a certain period of time. The skilled artisan would appreciate that the bait might have to be replaced after a certain time period, if the insects are to be collected over larger durations of time.

At step 204, a cycle time for collecting samples is set using the switching unit of apparatus 100. For example, the cycle time may be set to 1 hour, 5 hours, 10 hours, 24 hours, 3 days, 1 month and so forth based on the desired duration for collecting insect samples. For example, if it is desired to study the activity pattern of insects within 2 hours, then the cycle time may be set to 2 hours. Setting the cycle time also depends on the number of containers to be used. For example, if apparatus 100 is designed to hold 8 containers, and samples are to be collected only in 4 containers, then the cycle time would be have to be appropriately set such that in one cycle time, perforated disk 144 of apparatus 100 only revolves by 180° or in other words completes half a rotation. The cycle time may be set at the moment apparatus 100 is to be deployed so as to permit accurate measurement.

At step 206, apparatus 100 is deployed in a target area. For example, if it desired to collect insects in a wheat plantation, apparatus 100 may be deployed in a suitable position in the wheat plantation. In another example, if it desired to collect insects in palm plantations, apparatus 100 may be hanged on a palm tree using slots 188a. The support structures of apparatus 100 may be retained in the open position illustrated in FIG. 1A to lure insects into apparatus 100.

When apparatus 100 is deployed in the target area, insects may get lured by the bait and enter apparatus 100 via the openings on first receiving part 110. The insects may get lured to enter apparatus 100 via the openings if the bait is placed appropriately within first receiving part 110. If the bait or pheromone is placed appropriately within first receiving part 110, the bait can only be accessed via the openings on first receiving part 110. Once the insects enter first receiving part 110 via the openings, the insects get trapped into the containers of collecting unit 104 via first trapping part 112 and second trapping part 114. The internal surface of first trapping part 112 and second trapping part 114 may be appropriately textured to facilitate sliding of the insects in the containers.

In operation, the control unit causes rotor 170 of motor 168 to rotate after a certain time, which in turn causes second trapping part 114 and perforated disk 144 to rotate from one container to another. Accordingly, each container is only used for a certain amount of time in one cycle. For example, if the cycle time is set to 1 hour, and there are 6 containers, then each container will be positioned to receive trapped insects from third part 138 of second trapping part 114 for 10 minutes. In other words, in the foregoing example, each container will be used for 10 minutes for collecting insects, after which the neighbouring container will be used. The process will continue till the cycle gets completed.

At step 208, apparatus 100 is removed from the target area. Apparatus 100 is removed from the target area after the cycle is completed. Subsequently, the containers are removed from apparatus 100 to analyze the collected sample of insects. Alternately, the containers may be substituted with new containers if it is desired to conduct a different study in the same target area.

At step 210, the collected samples of insects are analyzed. Since the captured insects are time sorted, a number of analyses may be applied. Parameters such as, but not limited to, number of insects captured, sex of attracted insects, species of insects that are captured if more than one pheromone types would be used and effectiveness of bait may be recorded and observed under various environmental conditions.

Thus, the method and apparatus captures insects in a time sorted manner. The apparatus is portable and battery operated, which makes it suitable for deployment in harsh geographical and weather conditions. Additionally, the apparatus is designed to work efficiently with minimum human intervention. The time sorted capture of insects provides additional advantage while planning remedies for eliminating insects from infested areas. For example, analysis of time sorted capture of adults of red palm weevil might indicate that the red palm weevils are active during certain day times or under specific weather conditions.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. An apparatus for capturing and time-sorting one or more insects comprising:
   a receiving unit configured to:
      serve as an entrance for the one or more insects; and
      facilitate trapping of the one or more insects;
   the receiving unit comprising:
      a first receiving part configured to serve as the entrance for the one or more insects, the first receiving part comprises one or more openings, at least one of the one or more openings is configured to serve as the entrance for the one or more insects, the first receiving part is substantially tubular, the one or more openings are distributed uniformly along a peripheral surface of the first receiving part; and
      a first trapping part attached with the first receiving part, the first trapping part is configured to receive the one or more insects from the first receiving part for collection and retention of the one or more insects in the plurality of containers, the first trapping part is substantially funnel-shaped, wherein a first end of the first trapping part is attached with a first end of the first receiving part for receiving the one or more insects from the first receiving part;
   a collecting unit comprising a plurality of containers configured to collect and retain the one or more insects trapped via the receiving unit, wherein the collecting unit is attached with the receiving unit such that at least a portion of the receiving unit is movable with respect to the plurality of containers, the portion of the receiving unit movable with respect to the plurality of containers is a second trapping part, the second trapping part is movably attached with the first trapping part, wherein the second trapping part is configured to receive the one or more insects from the first trapping part for collection and retention of the one or more insects in the plurality of containers, the second trapping part is substantially tubular and is movably attached with the first trapping part such that at least a portion of the second trapping part is at a predetermined angle with respect to the collecting unit to facilitate collection and retention of the one or more insects in the plurality of containers, the collecting unit further comprises a disk, the disk comprises a first opening configured to enable collection and retention of the one or more insects received from the second trapping part in the plurality of containers, the disk is attached with the second trapping part at the first opening;

a control unit operationally connected with the receiving unit, wherein the control unit is configured to enable time-dependent movement of the portion of the receiving unit with respect to the plurality of containers, wherein the time-dependent movement enables collection and retention of the one or more insects in the one or more containers during a predetermined period of time for time-sorting the one or more insects.

2. The apparatus of claim 1, wherein the first receiving part is configured to accommodate a bait for luring the one or more insects into the first receiving part via the one or more openings.

3. The apparatus of claim 1, wherein the disk comprises a plurality of openings for at least one of:
   facilitating collection and retention of the one or more insects received from the second trapping part in the plurality of containers; and
   facilitating dissemination of gases from at least one container of the plurality of containers, wherein the at least one container contains at least one of the one or more insects received from the second trapping part.

4. The apparatus of claim 1, wherein the collecting unit further comprises a support frame configured to support at least one of the plurality of containers, the disk, the first receiving part, the first trapping part and the second trapping part.

5. The apparatus of claim 4, wherein the support frame is substantially disk shaped, wherein the plurality of containers are arranged about a circumference of the support frame.

6. The apparatus of claim 5, wherein the collecting unit further comprises a separator attached with the support frame, wherein the separator is configured to enable accommodation of the plurality of containers about the circumference of the support frame.

7. The apparatus of claim 4 further comprising a motor configured to enable the time-dependent movement of the second trapping part.

8. The apparatus of claim 7, wherein the motor is attached with the support frame and a rotor is attached with a central portion of the disk at a first side of the disk such that support frame supports the motor and the disk.

9. The apparatus of claim 8 further comprising a shaft for enabling the time-dependent movement of the second trapping part, wherein the shaft attaches the disk with an other portion of the second trapping part, further wherein the attachment enables the support frame to support the second trapping part.

10. The apparatus of claim 9, wherein the shaft is attached with the central portion of the disk at a second side of the disk for enabling the time-dependent movement of the second trapping part.

11. The apparatus of claim 4 further comprising one or more support members, wherein at least one support member of the one or more support members attaches the support frame with the first receiving part, thereby enabling the support frame to support at least one of the first receiving part and the first trapping part.

12. The apparatus of claim 4 further comprising one or more support structures, wherein at least one support structure of the one or more support structures is movably attached with the first receiving unit such that the at least one support structure is configured to partially encapsulate at least one of the first trapping part, the second trapping part, the disk and the plurality of containers.

13. The apparatus of claim 1, wherein at least one of the one or more insects is one of *Rhynchophorus ferrugineus* f, *Rhynchophorus* spp, *Orcytes* spp and *Cerambycides*.

* * * * *

UNITED STATES PATENT AND TRADEMARK OFFICE
CERTIFICATE OF CORRECTION

PATENT NO. : 8,943,742 B2  
APPLICATION NO. : 13/530103  
DATED : February 3, 2015  
INVENTOR(S) : Hassan Y. AlAyedh, Yousif N. Aldryhim and Osama J. Aldraihem Page 1 of 1

It is certified that error appears in the above-identified patent and that said Letters Patent is hereby corrected as shown below:

On the title page item 75, the name of the first inventor should be "Hassan Y. AlAyedh".

Signed and Sealed this  
Fifth Day of January, 2016

Michelle K. Lee  
*Director of the United States Patent and Trademark Office*

UNITED STATES PATENT AND TRADEMARK OFFICE
CERTIFICATE OF CORRECTION

| | | |
|---|---|---|
| PATENT NO. | : 8,943,742 B2 | |
| APPLICATION NO. | : 13/530103 | |
| DATED | : February 3, 2015 | |
| INVENTOR(S) | : Hassan Y. AlAyedh, Yousif N. Aldryhim and Osama J. Aldraihem | |

It is certified that error appears in the above-identified patent and that said Letters Patent is hereby corrected as shown below:

On the title page item 12 and item 75, the name of the first inventor should be "Hassan Y. AlAyedh".

This certificate supersedes the Certificate of Correction issued January 5, 2016.

Signed and Sealed this
Third Day of May, 2016

Michelle K. Lee
*Director of the United States Patent and Trademark Office*